United States Patent
Beauregard

[11] 3,750,346
[45] Aug. 7, 1973

[54] AUTOMATIC DEGATING APPARATUS
[75] Inventor: Louis Beauregard, North Hollywood, Calif.
[73] Assignee: Techno-Components Corp., Van Nuys, Calif.
[22] Filed: Oct. 7, 1971
[21] Appl. No.: 187,462

[52] U.S. Cl. .............................. 51/134, 51/215 HM
[51] Int. Cl. ......................... B24b 5/00, B24b 47/02
[58] Field of Search ................... 51/215 R, 215 AR, 51/215 HM, 215 CP, 215 H, 215 E, 215 N, 215 SF, 215 UE, 102, 127, 128, 134

[56] References Cited
UNITED STATES PATENTS

| | | | |
|---|---|---|---|
| 2,466,961 | 4/1949 | Nachazel | 51/215 H |
| 826,694 | 7/1906 | Shirley | 51/215 HM |
| 1,191,938 | 7/1916 | Bazzoni | 51/215 R |
| 1,516,103 | 11/1924 | Keller | 51/215 HM |
| 3,127,716 | 4/1964 | Peters et al. | 51/215 CP |
| 2,821,818 | 2/1958 | McGee et al. | 51/134 |
| 2,957,281 | 10/1960 | Hall | 51/134 |

Primary Examiner—Othell M. Simpson
Attorney—Spensley, Horn and Lubitz

[57] ABSTRACT

An automatic degating apparatus for removing the gate from molded parts. The apparatus comprises a system for automatically feeding the parts in a prealigned manner to a position adjacent a pickup wheel. The pickup wheel is adapted to receive the molded parts, one at a time, and to carry the parts in a guided manner past a sanding disc disposed so as to remove the gate and then to deposit the part in a finished parts tray. The sanding disc is slightly conical in shape with an axis of rotation annularly offset with respect to the axis of rotation of the pickup wheel so as to present to the parts an initially tapered sanding surface as the parts travel past the sanding disc. The apparatus has various adjustment devices and other features allowing the degating of parts of various sizes.

9 Claims, 15 Drawing Figures

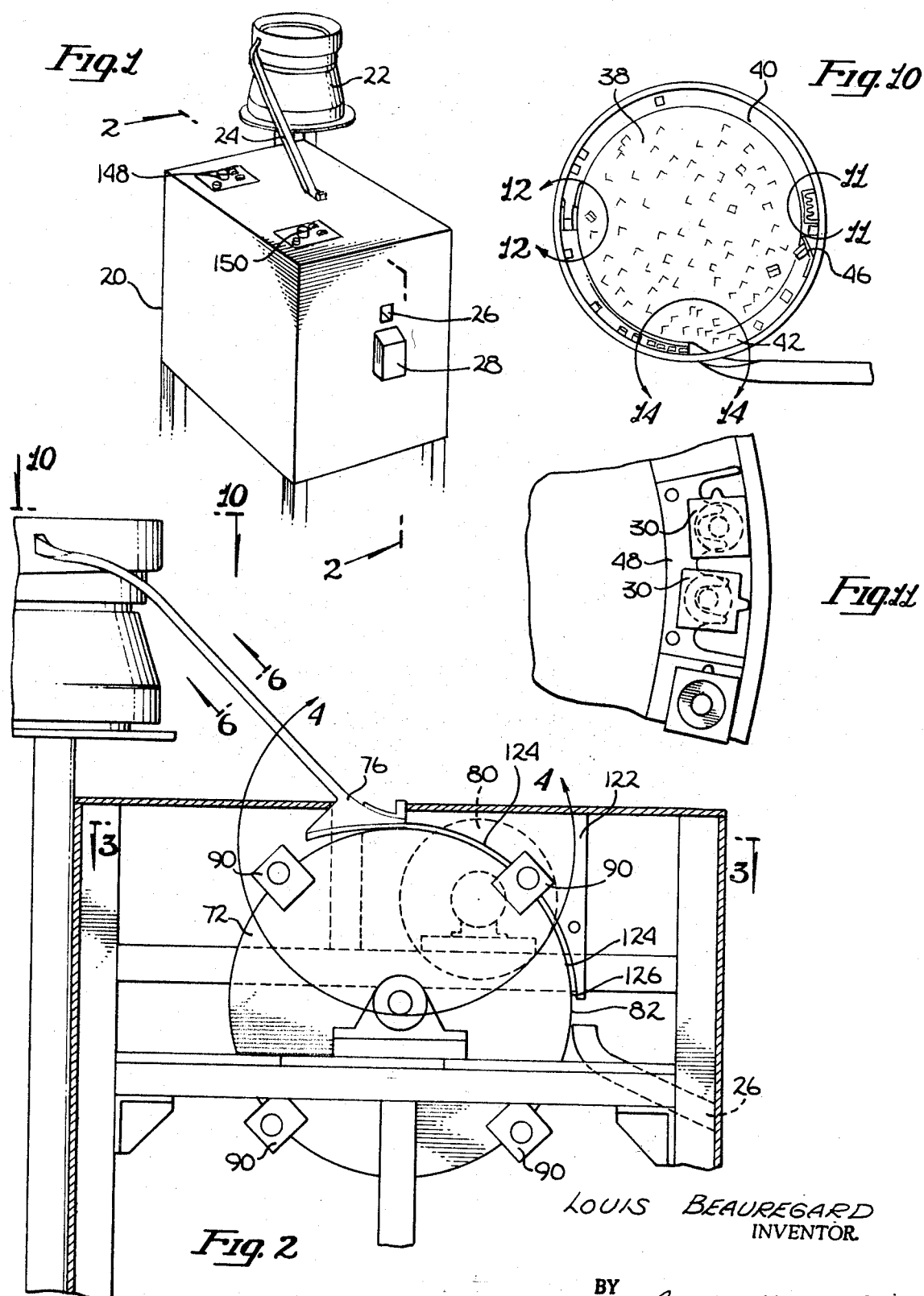

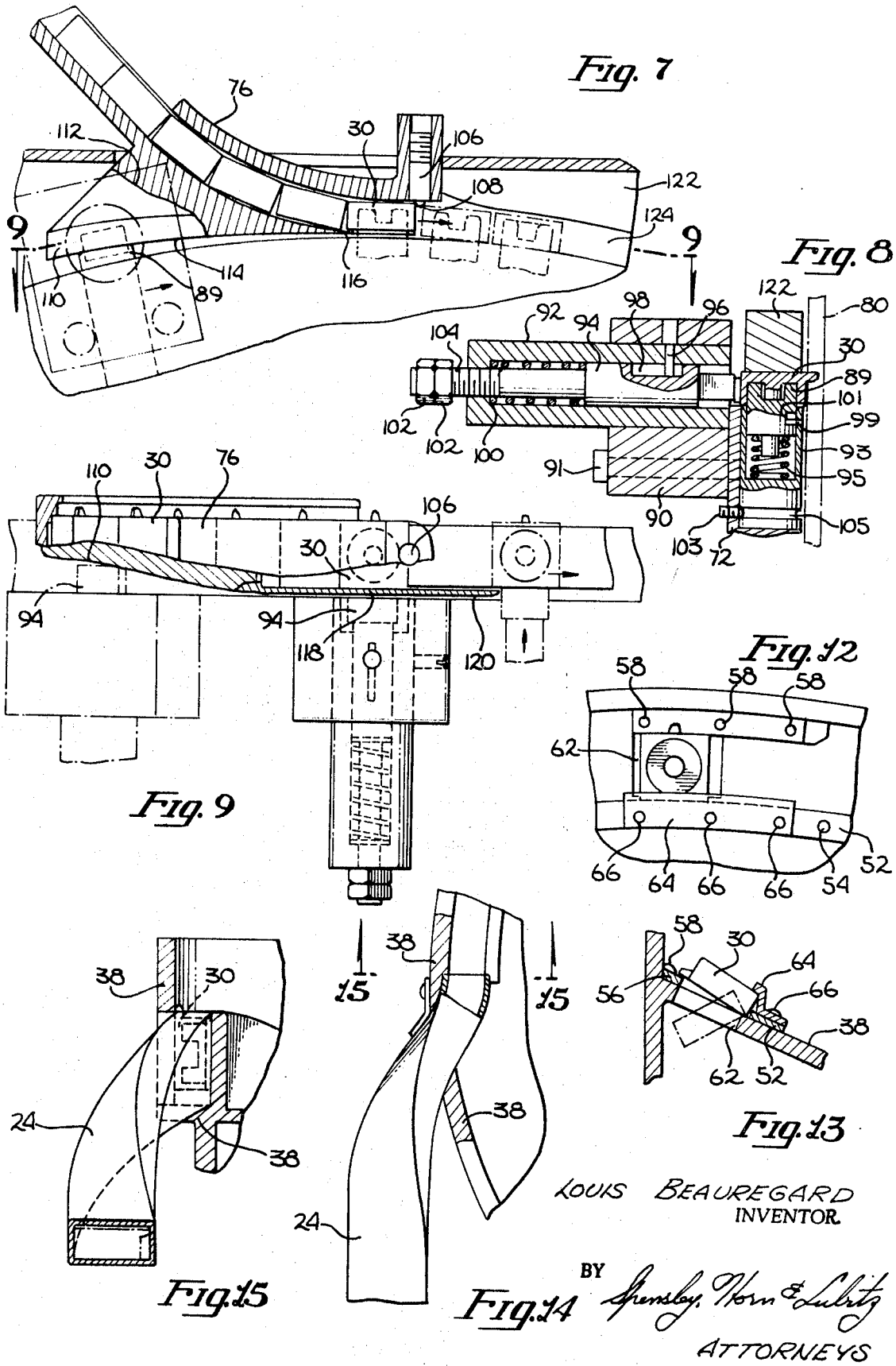

AUTOMATIC DEGATING APPARATUS

BACKGROUND OF THE INVENTION

1. Field of the Invention

This invention relates to the field of automatic production equipment, and particularly to equipment for orienting a large quantity of small parts and for performing some operation thereon such as the finishing of a surface thereon.

2. Prior Art

Great numbers and varieties of parts are today being molded on automatic molding equipment, such as injection molding equipment. In many cases the parts are very small, and since suitable injection moldable plastics are available at relatively low cost, the cost of the finished part is dependent primarily on such other costs as the injection molding cost and the cost of whatever subsequent operations are required to result in a finished part. To reduce the cost of molding, it is common to use a multiple cavity mold with each cavity connected to a central area for receiving the injected plastic. Thus, though the molding cycle duration is predetermined and limited for a particular molding machine, a plurality of parts may be molded in a single cycle, thereby producing a much greater number of parts with only a slight increase in the overall cost.

The item emerging from a multiple cavity mold has a spider-like appearance, with a desired part at the end of each leg, and a body section resulting from the cavity communicating with the injector. The parts are then broken off of the legs and the legs and body section disposed of. In order to facilitate the breaking of the legs adjacent to the parts and to minimize the protrusion of excess material from the part without causing a portion of the part to break away, it is common practice to design the mold cavities so that the legs have an area of reduced cross-section adjacent the part to define weakest areas of the legs in that region.

Thus, when the part is broken from the legs, there will be a small piece of the leg, herein referred to as a "gate," remaining on the part which must subsequently be removed. Of course, as an alternative, the legs may be necked down immediately at the junction between the leg and the part so as to substantially eliminate the gate. This, however, has the disadvantage that in breaking the part off the leg, a portion of the part may also break away, creating a slight pocket or indentation in a part and, in any event, leaving a generally unsightly fractured area on the surface of the part. Thus, it is common practice to proportion the leg so as to break adjacent the part and to remove the gate in a subsequent operation.

In the prior art, it is common to remove the gate by a hand operation such as, by way of example, theuse of a small disc sander with an operator picking up each part, properly aligning it and pushing it against the disc to sand off the gate. This procedure is expensive and time consuming. Furthermore, the end result is less than ideal since on some parts less than all of the gate may be removed while on other parts the entire gate and a portion of the part itself may be removed, both situations yielding a part which is not within its dimensional requirements.

One product which is assembled from parts molded in this manner are small potentiometers which are generally assembled using a plurality of molded parts such as polentiometers bases and the like. Since the parts themselves require an almost insignificant amount of material and may be very rapidly molded by multiple cavity molds, a very substantial amount of the cost of such parts is in the hand removal of the gate. Furthermore, since the allowable tolerance on the potentiometer cases is small, particularly for military applications, the gate must be carefully and accurately removed to assure that the finished potentiometer will meet its dimensional requirements. Thus, there is needed an automatic apparatus for quickly and accurately removing the gate from such parts so as to maintain good dimensional control and the desired physical appearance of the finished potentiometer.

BRIEF SUMMARY OF THE INVENTION

An automatic degating apparatus for removing the gate from molded parts. The apparatus comprises a system, of the vibratory type, for automatically aligning and delivering the parts in a predetermined manner to a position adjacent a pickup wheel in the degating machine. The pickup wheel is adapted to receive the parts one at a time and to carry the parts in a guided and aligned manner past a sanding disc, disposed so as to remove the gate, and to deposit the part in a finished parts tray. The sanding disc is slightly conical in shape with an axis of rotation angularly offset by a corresponding amount with respect to the axis of rotation of the pickup wheel, so as to present to the parts an initially tapered sanding surface followed by a sanding surface substantially parallel to the path of the part as the parts travel past the sanding disc. The sanding disc and its drive motor are mounted on a plate accurately movable with respect to the pickup wheel, with an indicator positioned with respect thereto so as to allow the easy adjustment of the sanding disc position with respect to the pickup wheel to accommodate parts of various sizes and/or vary the amount of material removal. Members mounted on the pickup wheel for engaging each of the individual parts are adapted for easy removal and change, as are the various members for selectively aligning and delivering the parts to the pickup wheel. Thus, the degating machine may readily be used with parts of various sizes.

BRIEF DESCRIPTION OF THE DRAWINGS

FIG. 1 is a perspective view of the degating machine of the present invention.

FIG. 2 is a partial cross section of the degating machine taken along the line 2—2 of FIG. 1.

FIG. 7 is a view taken along line 7—7 of FIG. 4 shown on the expanded scale.

FIG. 8 is a cross section of a portion of the pickup wheel and members mounted thereto taken along line 8—8 of FIG. 4.

FIG. 9 is a partial cross sectional view of the pickup wheel and the delivery assembly taken along the line 9—9 of FIG. 7.

FIG. 10 is a top view of the automatic parts feeder taken along line 10—10 of FIG. 2.

FIG. 11 is a view taken on an expanded scale, along line 11—11 of FIG. 10 showing a part of the parts-alignment mechanism of the automatic parts feeder.

FIG. 12 is a view taken on an expanded scale along line 12—12 of FIG. 10, illustrating a further portion of a parts-alignment mechanism of the automatic parts feeder.

FIG. 13 is a cross section of the alignment mechanism of FIG. 12 taken along line 13—13 of that figure.

FIG. 14 is a top view, in partial cross section, of a portion of the automatic parts feeder taken along line 14—14 of FIG. 10.

FIG. 15 is a further view and partial cross section of the portion of the automatic parts feeder shown in FIG. 14, illustrating the alignment and delivery of aligned parts into chute 24.

DETAILED DESCRIPTION OF THE INVENTION

Figure 3:
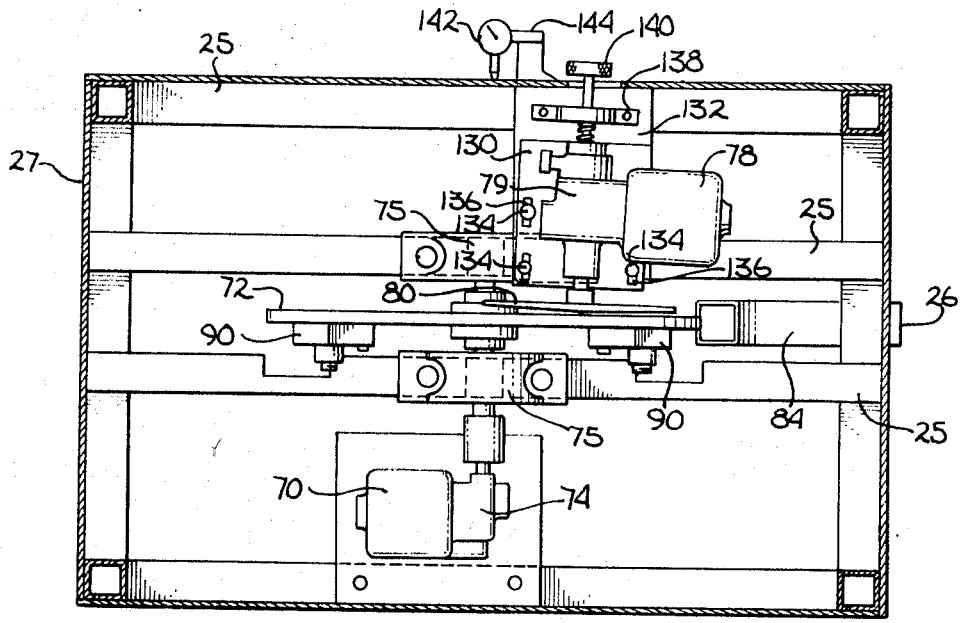
FIG. 3 is a cross sectional view taken along the line 3—3 of FIG. 2 showing the arrangement of the internal mechanism of the gate removal apparatus.

First referring to FIG. 1, a perspective view of the apparatus of the present invention may be seen. The degating apparatus is comprised of a degating machine 20 and an automatic parts feeder 22 coupled to the degating machine through slide 24. The automatic parts feeder 22 is of the vibratory type and is adapted to align the parts and maintain slide 24 substantially full of parts aligned in a specific manner. The parts are delivered through the slide 24 to the degating machine 20 wherein the gates projecting from the parts are accurately and quickly removed, with the finished parts being injected through opening 26 in the end of the degating machine and falling into a removable bin 28 thereunder.

Figure 5:
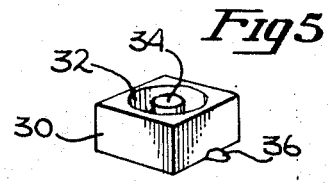
FIG. 5 is a perspective view of a typical part to be processed with the apparatus of the present invention.

Th specific parts to which the preferred embodiment of the present invention is designed to process are shown in FIG. 5, which is a typical molded plastic potentiometer case (pot case). The pot case 30 has a generally rectangular outer shape, the particular case shown being substantially square in horizontal cross section. A typical pot case will have an opening to house the potentiometer drive mechanism, wiper, etc., such as opening 32 in the pot case 30, and may have a central pin 34 to form a pivot for the wiper gear and the like. As the individual parts are broken away from the spider, a gate 36 will remain protruding from one of the rectangular side surfaces of the case. It is this gate which the present apparatus is adapted to automatically remove.

The automatic parts feeder 22 is of the vibratory type manufactured by Automation Devices Western, Inc., Santa Fe Springs, Calif., and commonly used for the automatic processing of small parts. This type of parts feeder is designed to vibrate in a combination linear and angular manner so as to encourage the parts along a predetermined path in the feeder and eventually out through a delivery system. Referring to FIG. 10, a top view of the automatic feeder 22 may be seen. The feeder contains a bowl, generally indicated by the numeral 38, for receiving a quantity of parts. The bowl is adapted to vibrate with a combination upward and counterclockwise motion, followed by a corresponding downward and clockwise motion. Thus, the parts in the bowl are encouraged to move in a counterclockwise direction since there is a relatively high force between the parts and the bowl due to the upward acceleration. When the bowl moves downward, there is little or no force between the bowl and the parts, dependent upon the amplitude of the vibration, since the bowl tends to accelerate away from the parts during the downward motion. Consequently, the upward motion tends to move the parts in a counterclockwise direction with the downward motion providing little or no encouragement to the parts to move in a clockwise direction.

Around the periphery of the bowl 38 is a track, generally indicated by the numeral 40, spiralling upward from the base of the bowl, generally in the region 42, to a position well above the normal level of the parts in the bowl in the region generally indicated by the numeral 44. The vibration of the bowl, coupled with the contour of the bottom of the bowl, encourages the parts therein to progress onto the bottom of ramp 40 at point 42 and upward along the ramp. Of course, the parts as they enter the bottom of the ramp have no particular orientation and must be oriented by various devices along the track before being deposited in the slide 24.

The first item to be encountered along the track by the parts is an arm 46 mounted to the side of the bowl at a position above the track. The arm 46 is mounted above the track 40, a distance which is greater than the height of the pot case when lying flat, as in FIG. 5, but which is less than the height of a part lying on its side. Thus, parts lying flat, either as shown in FIG. 5 or inverted with the opening 32 directed downward, will pass arm 46, whereas parts lying on their side will be wiped away from the track by arm 46 and caused to fall back into the bowl with the rest of the parts.

The parts which pass arm 46 next encounter a fingered plat 48, which may be seen in greater detail in FIG. 11. The fingers extend inward beyond the center of the pot case so that a pot case passing thereby with opening 32 projecting upward will be supported on its flat base by the fingers. However, the depressions between the fingers are such that the region between the fingers engages less than half the width of the pot case, and the spacing between the fingers is chosen to be equal to the spacing between pin 34 and each of the two sides of the pot case (FIG. 5). Consequently, a pot case which proceeds to the fingered plate 48 with opening 32 directed downward will not be supported by the fingers but instead will fall downward with two fingers straddling pin 34, and will tumble back to the bottom of the bowl. Consequently, the pot cases proceeding beyond the fingered plate 48 are all positioned with opening 32 directed upwards as shown in FIG. 5. However, gate 36 on these pot cases has no particular orientation and such orientation is established by the assembly at position 50 shown in detail in FIGS. 12 and 13.

Figure 6:
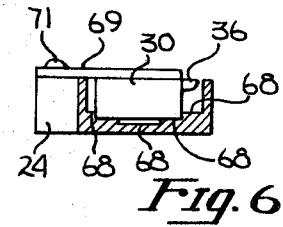
FIG. 6 is a cross sectional view of the slide 24 through which the aligned parts are delivered to the degating machine taken along line 6—6 of FIG. 2.
Figure 4:
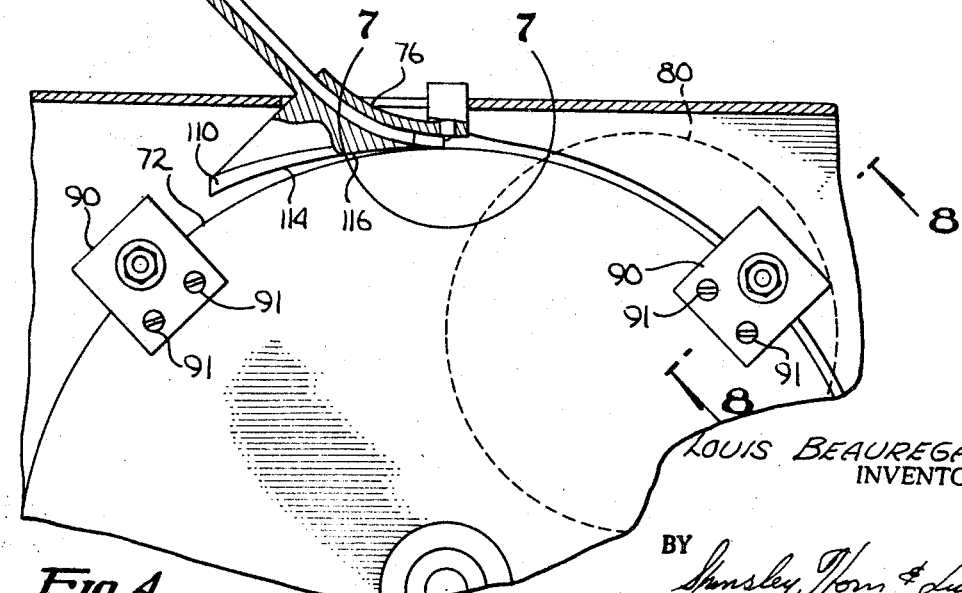
FIG. 4 is a side view of the pickup wheel and the delivery assembly adjacent thereto.

FIG. 12 is a cross section of the bowl 38 in the region 50 showing the manner in which the pot cases having the gate aligned in the desired manner are selectively allowed to pass that point of the track. FIG. 13 is a top view of the area of the track shown in FIG. 12. The track around the side of the bowl 38 slopes inward toward the center of the bowl as it approaches region 50. However, the potentiometer cases are prevented from sliding inward and falling off the track by a member 52, fastened to the lower edge of the track by screws 54 and projecting generally upward above the otherwise flat track surface so as to catch the lower edge of the pot cases and prevent them from sliding thereby. A member 56, disposed above member 52 and attached to the bowl by screws 58, has a tapered surface 60 which engages the gate on pot cases orientated with the gate extending upward so as to raise the upper end of the pot case for free passage over opening 62 in the track. The lower edge of the pot case is generally held in position by member 64 which is fastened through member 52 to the bowl by screws 66. Thus, pot cases oriented as shown in FIG. 12 will be caused to be raised above opening 62 and allowed to freely pass thereby, whereas pot cases with any other orientation will not engage member 56 and will fall through opening 62 on reaching the opening, as indicated in phantom in FIG. 12. Thus, the parts traveling past opening 62 are only those parts specifically oriented with the gate pointing toward the wall of the bowl and with opening 32 generally directed upward. As the parts proceed past region 50, they are continued to be rotated by the increased angularity of the track from the horizontal, and then as they engage the entrance to the slide 24, to ultimately undergo a full 180° rotation so as to proceed down slide 24 as shown in FIG. 6, which is a cross section of the slide 24 taken along line 6—6 of FIG. 1. The manner of achieving the 180° rotation may be seen in FIG. 14, which is a top view taken along line 15—15 of FIG. 10, and FIG. 15, which is a cross section taken along line 15—15 of FIG. 14. The slide 24 is characterized by various slide surfaces 68 which allow the use of the slide for varius size parts, and has a cover plate 69 attached to slide 24 by screws 71 to prevent the pot cases from being inadvertently forced out of the slide. abrasive The general arrangement of the degating machine may be seen in FIGS. 2 and 3. The machine has a frame 25 generally enclosed by sheet metal 21. A first drive motor 70 drives a disc 72 mounted to the frame 25 by bearings 75 through a gear reduction 74. The disc 72 has mounted thereon various members adapted to engage pot cases one at a time and to remove them from the delivery assembly, generally indicated by the numeral 76, connected to the slide 24. Also located in the degating machine is a second drive motor 78 coupled through gear reduction 79 to an abrasive or a sanding disc 80. It will be noted in FIG. 3 that the sanding disc is not perfectly flat but is purposely caused to be slightly tapered and further, the axis of the motor is angularly offset from a line parallel to the axis of disc 72. Thus, as the pot cases are caused to move past sanding disc 80 (with the gate projecting toward the sanding disc), the pot cases initially encounter an apparently tapered surface of the sanding disc, which taper effectively changes to a substantially flat surface as the pot case proceeds generally past the axis of the sanding disc. It will be noted that the pot cases actually are swept across the sanding disc along an arc which misses the axis of the disc by a substantial distance. This assures adequate surface speed of the abrasive with respect to the part being removed at all positions along the path of travel of the part and further makes gradual the transition between the apparently tapered portion and the apparently flat portion of the disc. As the pot cases proceed to position 82 (FIG. 2), they are disengaged by the disc 72 and allowed to fall into chute 84 and to pass outward through opening 26 in the front of the degating machine.

The manner in which the pot cases are picked up by disc 72, carried past sanding disc 80 and ejected for passage outward through the front of the machine through chute 84 may be seen in FIGS. 2, 4, 7, 8 and 9. of blocks 90 are attached to disc 72 by screws 91.

The blocks 90 support members 92 (retained thereto by screws 97) having mounted therein a plunger 94 of limited horizontal displacement by the engagement of a pin 96 in a slot 98 therein. The plungers 94 are encouraged to an extended position by coil spring 100, with the extent of extension being adjustable by jam nuts 102 engaging a threaded extension 104 on the plungers. Adjacent each of blocks 90 and disposed in a radial orientation in disc 72 are spring-loaded members 89 for engaging opening 32 in pot case 30. The spring-loaded members have a slip fit in guide 93, being elastically urged to a radially extended position by coil spring 95, the extent of the radial freedom being limited by a pin 99 projecting through a hole in the wall of guide 93 into a slot 101 in the spring-loaded member. Guide 93 is removably retained in disc 72 by screw 103 engaging groove 105 in the end of the guide. Thus, the entire guide may be removed as an assembly and replaced with guides having different spring-loaded members so as to accommodate pot cases and the like of various sizes and configurations.

Now referring particularly to FIGS. 7 and 9, the operation of the degating machine of the present invention shall be described in detail. FIG. 7 is a partial cross section of the delivery area 76 taken in a plane parallel to the plane of disc 72 and FIG. 9 is a partial cross section looking down on the same area. Also shown in these figures, sometimes in phantom, are the various members attached to the disc illustrating the manner in which individual pot cases 30 are picked up by the disc from the end of slide 24 and carried by the sanding disc. In general, slide 24 will be substantially full of pot cases, all of which have the same orientation. The lower end of slide 24 containing the pot cases curves to a disposition substantially tangent to the periphery of disc 72, with the pot cases 30 normally being restrained from further sliding along slide 24 by a screw 106 having a spring-loaded tip 108 which, in its extended position, intercepts the top edge of the lowest pot case and prevents its further movement parallel to th periphery of disc 72. As the wheel rotates, plunger 94 intercepts tapered surface 110 on the side of member 112, integral with and generally below the lower end of track 24, at approximately the same time spring-loaded member 89 engages the lower surface 114 of member 112. As the disc continues to rotate, plunger 94 and spring-loaded member 89 are elastically encouraged to a depressed condition by surfaces 110 and 114 respectively. When spring-loaded member 89 moves past end 116 of surface 114, the spring-loaded member snaps upward into opening 32 in the pot case 30. Thus, the pot case is firmly engaged by the spring-loaded member and is encouraged to move past spring-loaded tip 108 of screw 106. This allows the remaining pot cases in slide 24 to move downward until the next pot case moves into position against spring-loaded tip 108. At this time plunger 94 is retained in a retracted position by engagement with the continuation of surface 110 defined by projection 118 at the side of the pot cases. As the disc 72 continues to rotate, plunger 94 moves past the end 120 of projection 118 and thereafter is elastically encouraged against the side of the potentiometer case, thereby locating and aligning the case for continued travel past the sanding disc. Plate 122, which may be seen in FIG. 7 and perhaps better in FIG. 2, is substantially co-planar with disc 72, and with the disc defines an annular space 124 substantially equal to the thickness of the pot cases. Thus, spring-loaded member 92 encourages the pot case upward against the inner polished surface of plate 122 and causes each pot case to slide along the plate in its path of travel past the sanding disc.

After having encountered the sanding disc, the pot cases are carried past the tip 126 of plate 122 (FIG. 2). Once past the tip of the plate, the pot cases are no longer retained by the annular passage and, therefore, plunger 89 snaps outward so as to cause the pot case to slide away from the end of plunger 94. When spring loaded member 89 reaches the end of its travel, the spring-loaded member stops suddenly, allowing the inertia of the pot case to carry the case away from the end of spring-loaded member 89 to a position to be received by chute 84.

Thus, there has been described an automatic apparatus for accurately and quickly removing the gate from molded parts, such as potentiometer cases. The various parts of the apparatus which must be matched to potentiometer cases of specific sizes, such as slide 24 as previously described, are designed to accept cases of a plurality of sizes without change. Other parts of the apparatus, such as spring-loaded members 89, are readily removable so as to be replaceable with other spring-loaded members to accommodate parts of another size or configuration. Also, motor 78 driving sanding disc 80 is mounted on a plate 130 retained to a lower plate 132 fastened to frame 25 by a plurality of screws 134 in elongated holes 136. Thus, plate 130 is free to slide in a direction parallel to the axis of the disc within the limitations determined by slots 136. Block 138 is bolted directly to plate 132 and threadably engages thumb screw 140 engaging the rear of motor 78. Thus, thumb screw 40 may be used to adjust the position of sanding disc 80 with respect to disc 72 so as to accurately control and adjust the engagement of the sanding disc with the pot cases passing thereby. To aid in this adjustment, a dial indicator 142 is mount-ed to an extension 144 of plate 132 and abuts an extension 146 of plate 130. Also provided are motor speed controls and on-off switches 148 and 150 for each of the drive motors 70 and 78 respectively. The motor speed controls in the preferred embodiment are of the variable auto transformer type providing a variable voltage to the motors, the motors being of the universal type having a speed dependent upon the voltage applied thereto.

While the invention has been particularly shown and described with reference to preferred embodiments thereof, it will be understood by those skilled in the art that various changes in form and details may be made therein without departing from the spirit and scope of the invention.

I claim:

1. An automatic degating machine for removing the gate from molded parts comprising:

receptical means for holding and dispensing of parts, including alignment means for sequentially aligning said parts received from said receptical means in a specific orientation;

delivery means for receiving parts from said receptical means and for maintaining said parts in a line in side by side relationship with the gate on said parts projecting in a direction substantially perpendicular to said line;

abrasive means having an abrasive surface thereon and rotating about its axis, said abrasive surface adjacent said axis projecting outward beyond the plane of the periphery of said abrasive surface so as to define a generally conical surface, said axis of rotation of said disc being inclined from a line perpendicular to said predetermined path of said pickup means so as to present to each of said parts, first, an effectively tapered abrasive surface and then, a substantially flat abrasive surface parallel to said path, as each of said parts is carried past said abrasive means along said predetermined path;

pickup means for sequentially receiving parts from said delivery means and carrying said parts past said abrasive means in a predetermined path so that said abrasive means intercepts the gate on each of said parts and removes it therefrom; and finished part receiving means for receiving parts from which the gate has been removed, said pickup means being adapted to release each of said parts when the respective part has been carried past said abrasive means.

2. The automatic degating machine of claim 1 wherein said predetermined path of said parts past said abrasive means is separated from said axis of said disc by a substantial fraction of the radius of said disc.

3. The automatic degating machine of claim 2 wherein said pickup means comprises a rotating wheel and a stationary member adjacent a portion of the periphery of said wheel, said wheel and said stationary member defining an annular space therebetween, said delivery means being a means for delivering each of said parts substantially tangent to the periphery of said wheel and yieldably retaining them at the start of said annular space, said wheel having a plurality of spring loaded members adapted to engage sequentially, each of said parts, remove said parts from said delivery means, carry said parts along said annular space past said abrasive surface and eject said parts at the end of said annular space.

4. An automatic degating machine for removing the gate projecting outward from a first side of a part having at least one depression in a second surface, comprising:

delivery means for receiving and maintaining parts aligned in a line in side-by-side relationship with the gate on said parts projecting in a direction substantially horizontally and perpendicular to said line;

abrasive means:

a pickup wheel disposed generally adjacent said abrasive means, said delivery means being disposed above said pickup wheel and yieldably sequentially retaining each of said parts in a position immediately above the periphery of said pickup wheel with said depression facing each wheel, said wheel having at least one first spring-loaded member directed radially outward and engageable with said depression in said parts, said delivery means having a lower surface which together with the periphery of said wheel defines a space of decreasing radial width in the direction of rotation of said wheel and operative to elastically depress each of said first spring-loaded members as said wheel rotates said first spring-loaded members thereby, said space of decreasing radial width terminating adjacent said depression in said part yieldably retained immediately above the periphery of said pickup wheel so as to allow each of said first spring-loaded members to extend outward to engage said depression and retain the corresponding said part with respect thereto;

means of rotating said pickup wheel about its axis;

a confining member having an inner surface in the general shape of an arc of a circle disposed about the periphery of a part of said pickup wheel so as to define an annular space therebetween to confine each of said parts therein as said pickup wheel rotates so as to remove each of said parts from said delivery means and to carry said parts past said abrasive means and a finished part receiving means, cooperatively disposed adjacent the region where said annular space defined by said confining member and said pickup wheel terminates whereby said parts are disengaged by said first spring-loaded members and intercepted by said finished part receiving means as spring-loaded member rotates thereby.

5. The automatic degating machine of claim 4 further comprised of receptical means for holding and dispensing of parts, including alignment means for sequentially aligning said parts received from said receptical means in a specific orientation and for movement of said parts to said delivery means.

6. The automatic degating machine of claim 4 further comprised of a second spring-loaded member associated with each of said first spring-loaded members, said second spring-loaded members being disposed parallel to the axis of said pickup wheel adjacent the periphery of said wheel and elastically encouraged to be engageable with a side of each of said parts opposite said gate, said delivery means having a cam surface disposed to engage each of said spring-loaded members and elastically depress it as said wheel rotates said spring-loaded member thereby, said last named surface terminating so as to allow said each of spring-loaded members to engage said parts after the said corresponding said first spring-loaded member engages said depression.

7. The automatic degating machine of claim 6 wherein said abrasive means comprises a disc having an abrasive surface thereon and rotating about its axis.

8. The automatic degating machine of claim 7 wherein said abrasive surface adjacent said axis projects outward beyond the plane of the periphery of said abrasive surface so as to define a substantially conical surface is, and the said axis of rotation of said disc is inclined from a line perpendicular to said predetermined path of said pickup means; so as to present to each of said parts, first an effectively tapered abrasive surface and then, a substantially flat abrasive surface parallel to said path, as each of said parts is carried past said abrasive means along said predetermined path.

9. The automatic degating machine of claim 8 wherein said predetermined path of said parts past said abrasive means is separated from said axis of said disc by a substantial fraction of the radius of said disc.

* * * * *